2,703,303

PRODUCTION OF L.L.D-ACTIVE SUBSTANCES BY STREPTOMYCES

Edward L. Rickes, Rahway, and Thomas R. Wood, Murray Hill, N. J., assignors to Merck & Co., Inc., Rahway, N. J., a corporation of New Jersey No Drawing. Application February 25, 1950, Serial No. 146,404

9 Claims. (Cl. 195—80)

This invention is concerned generally with the production of valuable vitamin products by fermentation. More particularly, it relates to animal protein factor (APF) concentrates valuable as feed supplements, and to methods for preparing these APF concentrates which comprise fermenting aqueous nutrient mediums by means of selected strains of microorganisms of the genus Streptomyces and recovering APF active materials from the fermentation broths thus obtained.

This application is a continuation-in-part of our co-pending application Serial No. 38,175, filed July 10, 1948, now abandoned, which, in turn, is a continuation-in-part of our co-pending application Serial No. 20,356, filed April 10, 1948, now abandoned.

It has long been known that the usual animal feeds, and in particular those used for poultry, composed primarily of plant materials, such as cereal grains, soy bean meal, alfalfa, and the like, and adequate with respect to their content of amino acids, minerals, and vitamins of known chemical structure, are deficient in a factor or factors required for maximum rate of growth and adequate reproduction. This factor is characterized by a pronounced tendency to be stored in the tissues and to be carried through the egg to the chick. Hens must be fed rations containing this factor in order to maintain adequacy of egg hatchability and viability of the chicks hatched. Chicks must receive the substance either directly in their feed or indirectly through the egg from the hen in order to grow at optimum rate and to avoid excessive mortality. It is obvious that the factor is of great economic importance to the poultryman.

In commercial practice good quality practical poultry feeds contain this so-called "animal protein factor" (which will be referred to in this application as "APF") in the form of meat by-products, liver meal, fish meal, fish solubles, and the like. These materials are in relatively short supply. Both meat by-products and liver meal are expensive and add considerably to the cost of poultry raising. These substances are also open to the objection that they contain comparatively small and varying amounts of the "APF." It has therefore been desired to find a more concentrated, standardized and less expensive source of this important dietary constituent.

We have now discovered that "APF" concentrates, that is products containing a relatively high concentration of "APF" active constituents and adapted for the enrichment of animal feeds deficient in the "animal protein factor," can be prepared by fermenting aqueous nutrient mediums by means of selected strains of microorganisms of the genus Streptomyces and recovering "APF" active materials from the fermentation broths thus obtained. The strains of Streptomyces which we have found to be potential producers of "APF" concentrates are those which are capable of producing fermentation broths containing the LLD growth factor required for the growth of the microorganism *Lactobacillus lactis* Dorner.

Moreover, we have discovered that certain of these LLD-activity producing strains of Streptomyces are capable of synthesizing vitamin $B_{12}$ and/or vitamin $B_{12}$-like compounds.

When a vitamin $B_{12}$-producing strain of Streptomyces is propagated in an aqueous nutrient medium and the fermentation broth is subjected to a purification operation, pure vitamin $B_{12}$ is obtained therefrom. Vitamin $B_{12}$ is a new chemical compound fully characterized later in this specification, and disclosed and claimed in our co-pending application Serial No. 108,668, filed August 4, 1949.

Vitamin $B_{12}$ is capable of promoting the growth of *Lactobacillus lactis* Dorner and possesses marked and effective action in the therapeutic treatment of Addisonian pernicious anemia and other macrocytic anemias. We have discovered that, in an otherwise "APF" deficient chick feed, a level of approximately 0.000003% of vitamin $B_{12}$ (i. e., 30 micrograms of vitamin $B_{12}$ per kg. of feed) is capable of producing a satisfactory and apparently maximal effect on the growth rate of chicks.

By vitamin $B_{12}$-like compounds are meant the red crystalline compounds (not vitamin $B_{12}$) which are obtained when a fermentation broth containing them is subjected to the purification treatment utilized in the preparation of pure vitamin $B_{12}$ (as later described therein) but omitting the Craig countercurrent distribution procedure employed as the final step in this purification operation. These vitamin $B_{12}$-like compounds can be characterized by the fact that they are readily convertible to pure vitamin $B_{12}$ per se by treatment with cyanide ion, as disclosed in a co-pending application of applicants' assignee, Serial No. 120,009, filed October 6, 1949. We have discovered that these vitamin $B_{12}$-like compounds are equivalent, as a source of APF, to pure vitamin $B_{12}$.

The strains of Streptomyces which produce LLD-active substances (and which are potential producers of APF, vitamin $B_{12}$ and vitamin $B_{12}$-like substances) are selected by testing their fermentation broths for the presence (or absence) of the LLD growth factor. The assay of these fermentation broths for LLD content is carried out by utilizing the growth response to the LLD factor of the microorganism, *Lactobacillus lactis* Dorner, A. T. C. C. 10,697, which is available in the American Type Culture Collection. Hereafter in the description of this invention, this microorganism will be referred to by the abbreviated name, *L. lactis*. The fermentation of an aqueous nutrient medium by *L. lactis* results in the production of an acid; the amount of acid produced has been found to be a satisfactory measure of the growth of the microorganism.

*L. lactis* has been reported to require two growth factors, T. J. and LLD. The basal medium described below, which eliminates the requirement for the T. J. factor, does not contain the LLD factor and, alone, does not support growth of *L. lactis*. The composition of the basal medium, double strength, is as follows:

| | | |
|---|---|---|
| DL isoleucine | mg. | 200 |
| DL alpha-alanine | mg. | 200 |
| DL aspartic acid | mg. | 200 |
| DL valine | mg. | 200 |
| DL methionine | mg. | 200 |
| DL glutamic acid | mg. | 200 |
| DL threonine | mg. | 200 |
| DL serine | mg. | 200 |
| DL phenylalanine | mg. | 200 |
| DL leucine | mg. | 200 |
| L histidine | mg. | 200 |
| DL tryptophane | mg. | 400 |
| L arginine | mg. | 200 |
| L lysine | mg. | 100 |
| Aminoacetic acid | mg. | 200 |
| L cystine | mg. | 200 |
| DL norleucine | mg. | 200 |
| L tyrosine | mg. | 200 |
| Dextrose | gm. | 10 |
| Sodium acetate | gm. | 6 |
| Fumaric acid | gm. | 0.5 |
| Sodium ethyloxalacetate | gm. | 0.5 |
| Riboflavin | mcg. | 200 |
| Calcium pantothenate | mcg. | 200 |
| Thiamin HCl | mcg. | 200 |
| Nicotinic acid | mcg. | 200 |
| Pyridoxamine | mcg. | 400 |
| Paraaminobenzoic acid | mcg. | 40 |
| Biotin | mcg. | 0.4 |
| $MgSO_4 \cdot 7H_2O$ | mg. | 200 |
| NaCl | mg. | 10 |
| $FeSO_4 \cdot 7H_2O$ | mg. | 10 |
| $MnSO_4 \cdot 4H_2O$ | mg. | 10 |
| $K_2HPO_4$ | mg. | 500 |
| $KH_2PO_4$ | mg. | 500 |
| Folic acid | mcg. | 2 |

Casein hydrolyzate _____ gm__ 1.0
Water to 500 cc.

The basal medium is prepared by combining the amino acids, then adding dextrose, sodium acetate, fumaric acid, heating to dissolve, and immediately readjusting to pH 7. The sodium ethyloxalacetate and vitamins are then added, dissolved, and the solutions again adjusted to pH 7. Finally, the salts, folic acid and casein hydrolyzate are added, dissolved, and the pH adjusted to 6.6.

As noted above, this basal medium does not support the growth of *L. lactis*. When a small amount LLD active substance, as for example pure vitamin $B_{12}$, is added to this basal medium, the medium thus supplemented does, however, support the growth of *L. lactis*, and the extent of growth is a direct function of the amount of LLD growth factor added. The LLD content of the substance added to the medium can therefore be measured by fermenting the supplemented medium by means of *L. lactis* under controlled conditions of time and temperature and then titrating the acid produced during the fermentation. The LLD content of substances thus assayed is expressed in terms of the arbitrarily assigned "LLD" unit; pure crystalline vitamin $B_{12}$ contains $11 \times 10^6$ LLD units per milligram.

The relationship between the LLD units added to the basal medium and the acid produced by fermentation of the medium by *L. lactis* is expressed by means of a standard curve which is plotted from values obtained using pure crystalline vitamin $B_{12}$ as a standardized source of the LLD factor. These values are obtained as follows: Stock cultures of *L. lactis* are maintained on a growth medium which consists of: 1% Difco yeast extract, 0.02% tomato juice serum, 1% anhydrous dextrose, and 1.5% agar. An inoculum is prepared using as a medium the basal medium previously described to which has been added an amount of vitamin $B_{12}$ equivalent to 1 LLD unit per cc. of medium. The inoculum cells thus obtained are washed with sterile distilled water and diluted to form a standardized suspension of *L. lactis* which reads between 90% and 95% light transmission on the Evelyn photometer with a 520 mu filter.

A stock solution of vitamin $B_{12}$ is diluted so that the solution contains exactly 0.8 LLD unit per cc., (i. e., 0.000073 microgram of vitamin $B_{12}$ per cc.) and 0.0, 0.05, 0.1, 0.2, 0.3, 0.4, 0.6, 0.8, 1.0 and 2.0 LLD units are added to duplicate series of tubes. The volume of solution in each tube is adjusted to 2.5 cc. by addition of water, 2.5 cc. of the basal medium is then added to each tube, and the tubes are plugged and sterilized by heating at 120° C. for 13 minutes. After cooling to room temperature, the tubes are inoculated with one drop of the standardized suspension of *L. lactis* prepared as described above and then incubated at 37° C. for 40 hours. After incubation, the tubes are titrated directly with 0.05 N sodium hydroxide to the blue-green endpoint of bromthymol blue. Typical titration values for the standard series listed above are: 1.5, 2.0, 2.7, 4.3, 5.7, 6.6, 7.5, 7.9, 8.0 and 8.4 respectively, in terms of the milliliters of 0.05 N sodium hydroxide required to neutralize the acids produced per culture of *L. lactis*. The standard curve is then obtained by plotting each of these titration values against the value for the LLD units originally added to the corresponding tube prior to fermentation.

In order to select an LLD-activity producing strain of Streptomyces, a culture of the microorganism under investigation is diluted, plated out on a solid nutrient medium, and incubated to produce a considerable number of single cell colonies. Individual colonies, picked for inoculum development, are then grown in a liquid medium, supplemented with cobalt nitrate at a concentration of 0.1 part of cobalt per million parts of medium, under submerged conditions in shake flasks. A sample of fermented broth from each shake flask is then assayed for LLD activity.

A preliminary experiment is carried out in order to determine (1) whether the broth has any LLD activity and (2) the approximate value of this LLD activity. The fermented broth from each shake flask is diluted with approximately 500 parts of water (for a broth containing 100 LLD units per cc., the diluted broth would thus contain approximately 0.2 LLD unit per cc.), and 2.5 cc. of the resulting solution is mixed with 2.5 cc. of the LLD assay basal medium. The tubes are then sterilized, inoculated, and incubated in the same manner employed in obtaining the values used in plotting the standard curve; after incubation, the contents of the tubes are titrated with 0.05 N sodium hydroxide to the blue-green endpoint of bromthymol blue. The total LLD units contained in the tube prior to the fermentation can then be read from the standard curve at the point corresponding to the above titration value. The above approximate test is sufficient to determine whether or not a given strain of Streptomyces is capable of producing LLD active substances.

An exact value for the LLD content of these Streptomyces fermentation broths, which is indicative of the capacity possessed by the particular strain for producing vitamin $B_{12}$ or other APF active substances, is determined as follows: A sample of the fermentation broth from each shake flask is diluted, on the basis of the approximate LLD activity determined as described above, so that the solution contains 0.2 LLD unit per cc., and this solution is added to the assay tubes in 0.5, 1.0, 1.5, 2.0 and 2.5 cc. amounts. The volume of solution in each tube is then adjusted to a volume of 2.5 cc. by addition of water, 2.5 cc. of the basal medium is added, and the tubes are sterilized, inoculated, incubated, and titrated with 0.05 N sodium hydroxide as previously described. Comparison of the titration values thus obtained with the standard curve gives a series of values for the LLD units contained in each of the assay tubes and, by a simple calculation, the precise LLD content of the broth taken from the original shake flasks.

It is a feature of the present invention that, instead of isolating the vitamin $B_{12}$, vitamin $B_{12}$-like compounds, or other APF-active substance in pure form from fermentation broths, concentrates of said broths can be employed as feed supplements in amounts depending on the content of APF active substances as measured by the hereinafter described chick test. We have discovered that such concentrates can be prepared in a commercially practicable way by fermenting an aqueous nutrient medium with selected strains of Streptomyces, and then separating volatile constituents from the resulting fermented broths at temperatures below those destructive of said APF vitamin substances. We have found that the dried residue from such filtered fermented broths can have a potency of as high as about 140 LLD units per mg. and that concentrates containing 2,000 LLD units per mg. or higher, are readily obtainable. In contrast to this the richest sources of APF previously available, such as fish solubles and fish meal, have been found to contain only about 1–3 LLD units per mg.

It should be noted that an APF deficient basal poultry ration is rendered dietetically adequate with respect to APF by adding to said ration 0.000003% of vitamin $B_{12}$, and that this amount of vitamin $B_{12}$ produces a growth response in chicks equivalent to that produced by about 1 to 5% fish solubles, fish meals, and the like. This ratio of vitamin $B_{12}$ corresponds to a level of about 330,000 LLD units per kg. of feed. A concentrate of 2000 LLD units per mg. potency, such as that mentioned above, supplies a level of 330,000 LLD units per kg. of feed when added in the proportion of 165 mg. of concentrate per kg. of feed (i. e., 0.0165%).

It is known that various fermentation solubles, that is, the products obtained by evaporating to dryness fermentation liquors produced in the manufacture of butyl alcohol, grain alcohol, etc., have been employed as feed supplements primarily because of their content of riboflavin and other vitamins of known structure, such as biotin, pantothenic acid, etc. There is no indication in the prior art, however, that Streptomyces fermentation liquors might contain vitamin substances which would be useful as feed supplements for enriching feeds deficient in "animal protein factor."

We have found that the prior art fermentation solubles contain only small amounts of LLD active substances; for example, butyl fermentation solubles contain only about 4 LLD units per mg. and grain distillers solubles contain less than 1 LLD unit per mg. We have been unable to isolate any vitamin $B_{12}$ from these materials and none of these prior art fermentation solubles has proved satisfactory for the enrichment of foods deficient in APF.

Although we have discovered that all LLD-activity producing strains of Streptomyces are potential producers of APF, we ordinarily prefer to prepare APF-active ers of APF, we ordinarily prefer to prepare APF-active substances utilizing those strains of Streptomyces capable of producing fermentation liquors which, when concentrated and the concentrate added to an APF-deficient chick feed in an amount not exceeding 10% by weight of said feed and the enriched feed fed to chicks hatched from eggs laid by hens maintained on an APF-deficient diet, will produce a maximal rate of growth in said chicks comparable with that obtained by feeding the chicks said APF-deficient chick feed supplemented with 30 micrograms of vitamin $B_{12}$ per kilogram of feed. Assay of these fermentation residues obtained utilizing said preferred strains of Streptomyces has established that such fermentation residues contain LLD activity. As noted above, fermentation residues containing 140 LLD units per milligram and higher are frequently secured by evaporating fermentation broths obtained utilizing these preferred strains of Streptomyces.

Species of Streptomyces which include these preferred LLD-activity-producing and potential APF-producing strains are *Streptomyces griseus, Streptomyces albidoflavus, Streptomyces columbiensis* nov. sp., *Streptomyces roseochromogenus, Streptomyces antibioticus, Streptomyces fradiae,* and *Streptomyces venezulae.* Of especial interest are those strains of *Streptomyces griseus* which, in addition to synthesizing vitamin $B_{12}$ or other APF active substance also produce one of the antibiotics, streptomycin or grisein. We wish to emphasize, however, that for any given species of Streptomyces it is necessary to select strains which produce fermentation residues having LLD activity and which produce growth stimulation in chicks when used to supplement APF-deficient feeds as outlined in the preceding paragraph and as fully described in the chick test set forth hereinbelow. Our invention is neither limited to any species of Streptomyces, nor does it include every strain of any given species. On the other hand, every strain of Streptomyces yet tried, which produces fermentation residues containing 4 LLD units per mg. and satisfying the requirement of the chick test, has been found satisfactory for producing concentrates adapted for the enrichment of animal feeds deficient in the "animal protein factor."

In order to select these preferred strains of Streptomyces, fermented broths produced in shake flasks by LLD-activity producing strains as determined hereinabove are evaporated to dryness under reduced pressure at temperatures below those destructive of the vitamin content. The fermentation residues thus obtained are assayed for LLD content. Those strains, which produce fermentation residues having an LLD content of at least 4 LLD units per milligram, are used to prepare additional quantities of the corresponding fermentation residues.

Various procedures may be employed for preparing these fermentation residues from the fermented broths. For example, the broth may be filtered to remove microorganism cellular debris and other insoluble matter and the filtrate concentrated by evaporation followed by spray drying to produce a solid concentrate for the APF chick test. A very convenient method for the preparation of the dried fermentation residue is to freeze dry the whole fermented broth.

If a fermentation residue prepared by the above described methods gives evidence of toxicity when fed to chicks, the culture which produced it is not discarded, but instead certain methods for removal of toxic factors, well-known to chemists skilled in the incident art, are applied to the fermented broth and crude fermentation residue. Such methods involve treatment of the fermented broth by heat, or with selective extractants such as ion exchange resins, solvents, and the like. If none of these toxin removal methods is successful, the strain under investigation is discarded as being of no interest from a practical standpoint for the production of an APF concentrate.

Those fermentation residues which are not toxic to chicks, or from which the toxic factors have been removed, are added to an APF-deficient basal diet and the supplemented diet tested for growth response in chicks. This chick test is carried out using chicks hatched from eggs laid by hens maintained on a diet deficient in APF. Day-old chicks are placed on a basal diet (which does not contain APF) as follows:

| | Per cent |
|---|---|
| Soy bean meal | 70.0 |
| Commercial dextrose | 7.9 |
| Cellulose | 5.0 |
| Wheat germ oil | 4.5 |
| Calcium gluconate | 2.5 |
| Glycine | 2.0 |
| DL-methionine | 0.9 |
| $CaCO_3$ | 1.5 |
| $K_2HPO_4$ | 1.612 |
| $KH_2PO_4$ | 1.0 |
| NaCl | 0.838 |
| $MgSO_4.7H_2O$ | 0.51 |
| $CaPHO_4.2H_2O$ | 0.375 |
| Ferric citrate | 0.138 |
| $MnSO_4.4H_2O$ | 0.025 |
| KI | 0.004 |
| $SuSO_4.5H_2O$ | 0.0015 |
| $ZnCl_2$ | 0.00125 |
| L-arginine | 0.50 |
| L-cysteine | 0.20 |
| Choline | 0.20 |
| Inositol | 0.10 |
| p-Aminobenzoic acid | 0.03 |
| Niacin | 0.01 |
| Ca pantothenate | 0.004 |
| Riboflavin | 0.002 |
| Thiamin | 0.002 |
| Pyridoxine | 0.002 |
| Pteroylglutamic acid | 0.0004 |
| Menadione | 0.0004 |
| Biotin | 0.00004 |
| A & D Powder | 0.10 |

After 5 days on the above basal diet, four groups of 7 chicks each, balanced in regard to body weight, are selected and each group is given the foregoing basal diet supplement as follows:

(1) No supplement added to basal diet.
(2) 0.000003% crystalline vitamin $B_{12}$ is added to basal diet.
(3) Ten percent by weight of fermentation residue derived from strain of Streptomyces under consideration is added to basal diet.
(4) The same fermentation residue referred to in item (3) is added to the basal diet in sufficient amount to provide 330,000 LLD units per kilogram of feed.

The average weight of the chicks in each of the four groups fed the indicated diets is determined every 2 or 3 days over a period of approximately 3 weeks. If the chicks, fed either of the diets containing the fermentation residue, as specified under either (3) or (4) above, show a maximal rate of growth comparable with that obtained in the group of chicks fed diet (2), then that strain of Streptomyces from which this fermentation residue has been obtained is classified as one of the preferred strains.

As noted hereinabove, we have further discovered that certain of these LLD-activity producing strains of Streptomyces are capable of synthesizing vitamin $B_{12}$ and/or vitamin $B_{12}$-like compounds, and the quantity of these substances contained in a fermentation broth can be definitely established by a chemical assay procedure. In view of the fact that vitamin $B_{12}$ and vitamin $B_{12}$-like compounds possess APF activity, this chemical assay procedure provides a reliable and convenient method for selecting strains of Streptomyces which produce APF active substances.

In order to select a strain of Streptomyces which produces vitamin $B_{12}$ and/or vitamin $B_{12}$-like compounds, an LLD-activity producing strain (selected utilizing the previously described LLD test), is used to ferment about 15 liters of an aqueous nutrient medium containing approximately 0.1 part per million of cobalt added as cobalt nitrate, said fermentation being carried out under submerged, aerated conditions. The mycelium is removed from the resulting fermented broth, the fermentation liquor is adjusted to a pH of 7.0, 75 grams of activated carbon (Norit A) is added and the mixture is slurried for 15 minutes. The slurry is filtered using a precoat of diatomaceous silica (Supercel) and the carbon is washed with 1 liter of water. The wet carbon is slurried for 15 minutes in a mixture of 225 cc. of n-butanol and 250 cc. of water and the mixture is filtered to remove the carbon using a precoat of diatomaceous silica (Supercel). The first part of the filtrate is caught separately as there are some carbon fines that are filtered off in a separate Büchner funnel. The combined filtrates (both n-butanol and water phases) are placed in a separatory funnel and allowed to separate. The lower layer (water layer) is drawn off and placed in a graduate.

After filtering off most of the two-phase solution (making sure the carbon cake does not go dry), the cake is washed with water and the washings are added to the water layer from the original filtrate contained in the graduate. The washing is continued until there has accumulated a total of 400 cc. of rich water (combined volume of the water layer from original filtrate plus washings). If the last few cubic centimeters of wash are still highly colored, the carbon cake is washed with additional water until the color of the wash becomes very light.

This combined water layer and washings of about 400 cc. volume is placed in a separatory funnel with 60 percent of its weight of ammonium sulfate and 15 percent of its volume of benzyl alcohol. The mixture is shaken thoroughly and allowed to settle. The benzyl alcohol layer is separated and dried over sodium sulfate, and then decanted and dried with more sodium sulfate and filtered. This first rich benzyl alcohol is placed on a chromatographing column which contains 5 cc. of an activated alumina saturated with methanol.

The water layer from the first benzyl alcohol extraction is again extracted with 8% of its volume of fresh benzyl alcohol. This second benzyl alcohol extract is dried in two stages over the same sodium sulfate used for drying the first benzyl alcohol extract. After drying, the second benzyl alcohol extract is filtered and added to the first benzyl alcohol extract on the chromatographing column. A small amount (10 to 15 cc.) of benzyl alcohol is used for washing the flasks and the sodium sulfate on the filter. This wash is added to the benzyl alcohol already on the chromatographing column.

After all of the benzyl alcohol has passed through the column, the column is washed with a mixture of two volumes of acetone to one of methanol until all of the benzyl alcohol has been removed from the column and the effluent is water white. Anhydrous methanol is then added to the column to develop the color, the rich methanol cut is collected and four volumes of anhydrous ethyl ether are added thereto whereupon a red-colored precipitate forms. This precipitate is recovered by filtering through a medium porosity fritted glass filter. The precipitate on the filter is then removed from the filter by dissolving it in 5 cc. of water saturated with benzyl alcohol which is added dropwise to the material on the filter.

If the fermented broth, prepared utilizing the strain of Streptomyces under consideration, contained vitamin $B_{12}$, and/or vitamin $B_{12}$-like compounds, these substances, it has been established, will be present, in concentrated form, in this aqueous benzyl alcohol solution. The aqueous benzyl alcohol solution is therefore tested, using a spectrophotometer, for absorption within the range 5300 to 5500 Å wave length. If the aqueous benzyl alcohol solution shows maximum absorption at 5300–5500 Å wave length (such absorption property being characteristic of vitamin $B_{12}$ as well as of vitamin $B_{12}$-like compounds) then said solution contains vitamin $B_{12}$ and/or vitamin $B_{12}$-like compounds, and the strain of Streptomyces under consideration is a producer of at least one APF-active substance of the group consisting of vitamin $B_{12}$ and vitamin $B_{12}$-like compounds.

Where it is desired to have a quantitative measure of the total vitamin $B_{12}$ and vitamin $B_{12}$-like material present in the benzyl alcohol solution, the optical density at 5500 Å wave length of said solution is determined on a spectrophotometer compared with a standard solution of vitamin $B_{12}$. The value thus obtained is a measure of the total vitamin $B_{12}$ and vitamin $B_{12}$-like compounds.

The presence of vitamin $B_{12}$ per se in this aqueous benzyl alcohol solution and the amount of vitamin $B_{12}$ contained therein are determined by running an 8-plate Craig countercurrent distribution using a benzyl alcohol-water system. The fourth plate is used for determining the vitamin $B_{12}$ content; the activity is transferred completely into the 5 cc. water layer on this plate by adding 10 cc. of chloroform to the 5 cc. benzyl alcohol layer. The optical density for this water layer is determined on a spectrometer at 5500 Å wave length, and the amount of vitamin $B_{12}$ is calculated as follows:

$$\frac{\text{Optical density reading} \times \text{cc. water layer in plate}}{\text{Cell thickness in cm.} \times 6.4 \times 0.29} = \frac{\text{Mg. vitamin } B_{12} \text{ per 15 liters of original broth}}{}$$

(NOTE.—The figure 6.4 represents the optical density for 1 mg. of vitamin $B_{12}$ and 0.29 is the fraction of the total vitamin $B_{12}$ present in the fourth plate.)

From the above test, it is thus possible to determine whether a given strain of Streptomyces is capable of synthesizing vitamin $B_{12}$, as well as the amount of vitamin $B_{12}$ contained in the fermentation broth obtained when said strain is used to ferment an aqueous nutrient medium. All vitamin $B_{12}$-synthesizing strains of Streptomyces, as determined by this test produce fermented broths having LLD activity and APF-active fermentation residues which support the growth of chicks. We particularly desire to utilize these vitamin $B_{12}$-synthesizing strains of Streptomyces for the preparation of APF concentrates because it is possible, employing methods of purification which we have discovered, to refine the active principle and produce APF concentrates having any desired activity up to that possessed by pure crystalline vitamin $B_{12}$.

A still further advantage of the present discovery lies in the fact that the valuable vitamin products herein described can be prepared from waste fermentation liquors resulting from the production of the antibiotics streptomycin and grisein. The streptomycin and grisein fermentation processes involve the fermentation of mashes of low concentrations with the result that extremely large volumes of fermantation broth must be disposed of for a relatively small amount of streptomycin or grisein production. The residue from a large streptomycin fermentation plant may thus constitute many thousands of gallons of waste fermenation liquors per day.

No useful product was previously known to be present in these waste liquors. In fact, the total amount of vitamins of known structure actually contained in such liquors is too small to make it economical to concentrate the liquors for the recovery of said vitamins. These streptomycin fermenation liquors have therefore constituted a serious and costly waste disposal problem.

We have now made the surprising discovery that, by utilizing a strain of Streptomyces griseus which produces both streptomycin and vitamin $B_{12}$ (or other APF active substance) and by removing the streptomycin from the fermentation broth by adsorption on an ion exchange resin whose polar groups are carboxyl groups, there may be obtained a waste streptomycin liquor substantially free of streptomycin and containing said vitamin $B_{12}$ (or other APF active substance) in a concentration as measured by the LLD test of over 20 LLD units per milliliter. We have demonstrated that concentrates of high LLD activity can be recovered from this liquor, and that such concentrates can be used for the enrichment of animal feeds deficient in the "animal protein factor." When the strain of Streptomyces produces vitamin $B_{12}$ in addition to streptomycin, the waste liquor (after removal of the streptomycin) can be processed, if desired, to produce pure vitamin $B_{12}$. Likewise waste grisein liquors after recovery of the grisein antibiotic, may be treated to recover LLD rich concentrates or pure vitamin $B_{12}$.

In carrying out the present invention, we can employ any of the aqueous nutrient mediums ordinarily utilized in the propagation of Streptomyces. The usual nutrients include a carbon source, a nitrogen source, inorganic salts and growth factors when required. The carbon can be provided by a carbohydrate such as dextrose, maltose, xylose, invert sugar, corn syrup, and the like. The nitrogen can be provided by an ammonium salt, amino acids, or proteins, such as soy beans, oats, yeast, yeast extracts, tryptic digest of casein, meat extract, blood meal, protein meat and bone scrap, salmon meal, fish meals, fish solubles, distillers solubles, and the like. If desired, the Streptomyces can be propagated using proteins (or amino acids) without any carbohydrate being present in the medium, in which case the proteins (or amino acids) serve as the source of both the carbon and nitrogen required by the microorganism. The propagation is ordinarily carried out in an aqueous medium but a grain bran medium may also be used in place of said aqueous medium.

When an aqueous nutrient medium is used, it is sterilized and then inoculated with a culture of the selected strain of Streptomyces and the mixture is incubated under submerged conditions and at a temperature appropriate for the specific strain of Streptomyces employed. The potency (i. e. the LLD activity) of the fermentation broth thus obtained is assayed utilizing the growth response of the microorganism *Lactobacillus lactis* Dorner as referred to earlier in this application. The fermentation broth is then evaporated and the fermentation residue is tested for the presence of toxic factors and for APF activity by means of the previously described chick test. If the fermentation residue gives no evidence of toxicity and is APF active, it may be used, without further treatment, to enrich animal feeds deficient in APF.

It is ordinarily preferred, however, to filter the fermentation broth and treat the filtered broth with an adsorbent such as fuller's earth or activated charcoal, thereby adsorbing the APF active substances. This adsorbate is dried and can then be used as a feed supplement. If a feed supplement free of adsorbent is desired, the adsorbate can be eluted with suitable solvents such as aqueous or aqueous alcoholic solutions of pyridine or $\alpha$-picoline, for example an aqueous butanol solution of pyridine, and the resulting eluate evaporated to dryness. This procedure effects a partial purification of the APF active constituents and the solid product thus obtained is a concentrated source of growth factors adapted for the enrichment of APF deficient animal feeds.

When a strain of *Streptomyces griseus* which produces both streptomycin and APF active substances is used to ferment an aqueous nutrient medium as set forth above, and the fermentation broth evaporated to dryness, there is obtained a fermentation residue which contains some substances relatively toxic to chicks. It is therefore preferred to first recover the streptomycin from the fermentation broth and then to prepare a concentrate having APF-activity and free of chick toxic substances from the waste liquor thus obtained. The streptomycin is conveniently recovered from the fermentation broth, as described in a co-pending application, Serial No. 69,986, filed January 8, 1949, which issued as U. S. Patent No. 2,541,420 on February 13, 1951, by adsorption with an ion exchange resin whose polar groups are carboxyl groups. We have discovered that these resins offer substantial advantages over all other adsorbents which have been tried since they not only accomplish the adsorption of the streptomycin present in the broth in substantially quantitative yield and in a state of high purity, but also, at the same time, yield an effluent containing substantially all of the vitamin $B_{12}$ or other APF active substance present in the original fermentation broth.

Whereas, with other absorbents such as carbon, fuller's earth, synthetic sulfonic acid resins and zeolites, the adsorption step serves primarily as a concentration step, after which numerous intricate purification steps are required to separate the streptomycin from unwanted impurities and from the APF active substances, the streptomycin adsorbed directly from the broth by use of the carboxylic acid resins is completely free of APF active material and is of such purity as to yield directly a crystalline calcium chloride complex salt of streptomycin from methanol solution. The source of this high degree of purity is twofold. All non-basic materials fail to be adsorbed from the broth because of the ion-exchange nature of the adsorption. Further, the action of the resins has been found to be highly selective, adsorbing only streptomycin to the substantial exclusion of vitamin $B_{12}$ or other nitrogenous organic compounds in the broth. Secondly, the antibiotic is eluted from the resin by practically stoichiometric amounts of acid thus avoiding the necessity for introducing high concentrations of salts and acids common in most other type resin elutions.

By use of the carboxylic acid type exchange resins it is possible to recover streptomycin in quantitative yields from the fermented broth. In fact, the recoveries are so reliable and quantitative that an assay procedure for broths has been developed based on adsorption of streptomycin on resins, elution, and identification of the relatively pure streptomycin eluted by degradation reactions. As an ion-exchange process the recovery of streptomycin resembles a water softening operation; the streptomycin is removed from broth by passage over the resin, the resin is washed (eluted) with dilute acid and regenerated with alkali and is ready for reuse. Thus, no organic solvents are required and the resin adsorbent may be reused indefinitely.

Ion-exchange resins having carboxylic polar groups have heretofore been described in the literature. In general, they are formed either by condensing a phenol and an aldehyde, one of which contains a carboxyl group, particularly, resorcyclic acid and formaldehyde, or by the copolymerization of a polymerizable acid with a divinyl compound such, for example, as acrylic or methacrylic acid and divinyl benzene. Resins of this type are described in U. S. Patent Nos. 2,319,359; 2,333,754; 2,340,110; 2,340,111 and others and are characterized by the common quality of having their ion-exchange ability dependent upon carboxyl groups in the resin molecule. In the practice of the present invention we prefer to use a copolymer of acrylic or methacrylic acid and divinyl benzene as such resins possess a greater number of carboxyl groups per unit of weight and as a result thereof a higher capacity for adsorbing ions. We have found, however, that the capacity of ion-exchange resins to adsorb streptomycin is not dependent alone upon the number of polar groups in a given weight or volume of resin. It is also dependent upon the porosity of the resin for in a dense resin only the polar groups on the outer surface of the resin particle are able to react with the antibiotic whereas in the case of a resin of porous structure the streptomycin molecules will at least partially penetrate the pores of the resin and react with polar groups in the interior of the resin particle.

In the case of phenol-formaldehyde condensates a porous resin structure is obtained by having the condensation reaction pass through an aqueous gel stage in the manner well known to the art. In copolymers of polymerizable acids and divinyl compounds the porosity is to a large extent dependent upon the degree of cross-linking imparted by the divinyl component. In these copolymers the divinyl component contributes water-insolubility and a certain degree of hardness to the resin but at the same time detracts from the porosity of the resin. It is therefore desirable in practicing the present invention with this type of ion-exchange resin to use a resin containing the least amount of divinyl compound that will produce the physical properties required of an ion-exchange material.

The ion-exchange resins we have found to be most efficient in the practice of our process are copolymers of acrylic or methacrylic acid and divinyl benzene wherein the divinyl benzene component constitutes from 2½ to 5 per cent of the resin composition. Such resins have an extremely high capacity for streptomycin and in some instances will adsorb their own weight of streptomycin from broth. Their capacity is in excess of thirty times the capacity of an equal weight of the carbon adsorbents and from ten to thirty times the adsorptive capacity of sulfonic acid type exchange resins. Larger amounts of divinyl benzene may be used in making the resin but with sacrifice of capacity, and no advantage is to be gained by going beyond a 10% divinyl benzene content.

For the adsorption of streptomycin we prefer to have the resin in the form of its sodium salt for the sodium salt is economical to use, is readily replaced by streptomycin, and is non-toxic. Other monovalent metals are the substantial equivalent of sodium in operation but are not so economical to use. The ammonium salt form of the resin is our second choice. The resin in the form of its salt with divalent metals may also be used, although these metals are not so readily replaced by streptomycin as are the monovalent ions. The calcium salt form of the resin is particularly low in capacity for streptomycin and should be avoided unless a sequestering agent is added to the broth to aid in the replacement. The magnesium and copper salt forms have capacities slightly lower than the monovalent metal salt form. The resins may also be used in the hydrogen form or in a mixed form in which some of the carboxyl groups are in a salt form and some are in the hydrogen form.

The pH of the broth in contact with the resin should be above 4.5 and preferably at about the neutral point. When the resin is used in the form of a salt of a strong base, a rise in pH takes place within the column, particularly if an acidic broth is used. Therefore, even if the broth has a pH below 4.5, its pH will rapidly be brought to the operative range through a neutralization of the excess acidity by the exchange resin. However, to the extent that resin is used to neutralize acidity, it is not available for streptomycin adsorption and, therefore, it is preferable to neutralize any excess acidity by other means. The carboxylic resins will adsorb streptomycin from broths that are quite alkaline, and it seems that the upper operable pH limit is determined only by the stability of the streptomycin. While it is not likely that a broth of pH as high as 11.5 will be encountered in practice, the streptomycin may be separated even from a broth of this high pH. In such a case it would be preferable to use the resin in the hydrogen form.

It has also been observed that, while the presence of sodium ions in the fermentation broths does not materially affect the capacity of the carboxylic exchangers for streptomycin, the presence of some other ions, notably calcium ions, has a marked effect. It is therefore desirable, in those cases where a choice of fermentation conditions might lead to a high concentration of interfering cations, to remove the interfering effect of such ions by dilution, by complexing with a sequestering agent, or by removing the ions themselves by precipitation or by replacing them with sodium ions.

The fermentation broth containing the streptomycin, after such steps as filtering and adjusting the pH as may be necessary or desirable, is brought into contact with the carboxylic type ion-exchange resin. This is preferably accomplished by passing the broth through one or more columns of the resin. When a single column of resin is used, the adsorption step may be discontinued when streptomycin appears in the liquid leaving the column. At this point the capacity of the column for adsorbing streptomycin is not fully utilized. By continuing the adsorption step beyond this point leakage of streptomycin occurs but larger amounts are adsorbed by the resin. The broth leaving the partially exhausted column may be passed through a second column of fresh resin and the first column continued in operation until no more streptomycin is adsorbed. By operating two or more columns in this fashion and alternating the flow through the columns so that the leakage from a partially exhausted column passes through a bed of fresh resin, the full capacity of the resin for streptomycin may be utilized without waste through leakage.

After water is passed through the exhausted column to remove residual broth, the adsorbed streptomycin is recovered by passing through the column an aqueous solution of an electrolyte. Our preference is an aqueous solution of an acid, particularly a strong, inorganic acid such as hydrochloric acid. In place of an aqueous solution of an acid, a methanol solution may be used or a solution containing both water and methanol. The carboxylic type ion-exchange resins have such a strong affinity for hydrogen ion that the streptomycin can be readily removed from the resin by means of only a slight excess of strong acid. The acid will also remove from the resin whatever metal ions were not replaced by streptomycin during the adsorption step and, therefore, on elution there is obtained a slightly acidic aqueous solution of streptomycin that also contains some metal salts. When the adsorption step is run as described above so as to utilize most of the exchange capacity of the resin the amount of metal salts is so small as to present no process difficulties. The streptomycin may be recovered from this solution by neutralizing, then concentrating by evaporating preferably under reduced pressure to a small volume or to dryness, taking up the residue in methanol or other solvent that will dissolve the streptomycin but no appreciable amount of the salts present, filtering off the salts, precipitating the streptomycin from its methanol solution by the addition of acetone or other suitable precipitant and finally filtering and drying. The precipitated streptomycin thus obtained is readily converted to the crystalline calcium chloride complex salt by dissolving said product in methanol and adding the required amount of calcium chloride as described in the art.

When acid is used for eluting, the resin is left in the hydrogen form and, to convert it to the sodium form, an aqueous solution of sodium hydroxide is passed through the column or allowed to remain stationary in the column. After being washed to remove the regenerating solution, the column is ready for reuse in adsorption of streptomycin.

The effluent broth, from which the streptomycin has been quantitatively removed by passage of the fermentation broth through the ion-exchange resin, contains the APF active substance originally present in the fermentation broth. This effluent broth can then be evaporated to produce directly a fermentation residue, free of streptomycin and non-toxic to chicks, which can be used, without further treatment, for the enrichment of animal feeds deficient in APF. Alternatively, this effluent broth can be treated with an adsorbent such as fuller's earth or activated charcoal, thereby adsorbing APF active substances. This adsorbate, after drying, is suitable as a feed supplement for providing APF. If a more concentrated feed supplement free of adsorbent is desired, the adsorbate can be eluted with a suitable solvent and the eluate evaporated to dryness to produce a concentrated source of growth factors adapted for the enrichment of APF deficient animal feeds.

As previously noted, we especially prefer to prepare the novel APF concentrates utilizing a strain of Streptomyces which synthesizes vitamin $B_{12}$. The fermentation broths obtained by fermenting aqueous nutrient mediums with these vitamin $B_{12}$-synthesizing strains can be treated according to the procedures previously described to produce APF-active concentrates containing Streptomyces-synthesized vitamin $B_{12}$. Where the vitamin $B_{12}$-synthesizing Streptomyces produces an antibiotic or a material toxic to chicks the auxiliary product may be separated to produce an APF active fermentation residue containing vitamin $B_{12}$ which can be further processed if desired to produce concentrates rich in the vitamin $B_{12}$ component. For example, a fermentation broth obtained by propagating a strain of *Streptomyces griseus* which produces both vitamin $B_{12}$ and streptomycin can be treated with an ion-exchange resin, whose polar groups are carboxyl groups, thereby adsorbing the streptomycin to produce an effluent broth free of streptomycin and containing substantially all of the vitamin $B_{12}$ originally present in the fermentation broth. This effluent broth can then be evaporated to produce directly a fermentation residue, free of streptomycin and non-toxic to chicks, which contains vitamin $B_{12}$ and can be used for the enrichment of APF deficient animal feeds. Alternatively, the effluent broth can be treated with an adsorbent such as fuller's earth and the adsorbate dried to produce a more concentrated APF active product containing vitamin $B_{12}$.

Where a product of extremely high APF activity is desired or where it is desired to isolate pure vitamin $B_{12}$, the fermented broth obtained by fermenting an aqueous nutrient medium with a vitamin $B_{12}$-synthesizing strain of Streptomyces may be first treated with an adsorbent material such as activated charcoal which produces an adsorbate containing the vitamin $B_{12}$ present in the broth, together with various contaminants. (If streptomycin or grisein is present, the antibiotic is adsorbed along with the vitamin $B_{12}$ and, in the case of streptomycin containing broths, it may be preferred first to treat the broth with an ion-exchange resin to adsorb streptomycin; this is not essential, however, since the subsequent purification treatment separates the vitamin $B_{12}$ from other materials in the broth, including the antibiotic substance.) The adsorbate is then eluted with a suitable solvent such as an aqueous solution of pyridine or an alkyl substituted pyridine, and the eluate evaporated thereby producing an elaboration product which contains the vitamin $B_{12}$, together with some of the contaminates, such as grisein or streptomycin, which may have been present in the original broth. This procedure is described in detail in a copending application of applicants' assignee, Serial No. 18,848, filed April 3, 1948.

We have discovered that such elaboration products can be treated according to procedures described in detail in our co-pending applications, Serial No. 20,356, filed April 10, 1948 and Serial No. 108,668, filed August 4, 1949, to separate the vitamin $B_{12}$ or other APF active material from the antibiotic to produce APF active substances free from grisein or streptomycin. Regarded in certain broader aspects, these procedures involve extracting with a solvent an elaboration product, said elaboration product being prepared, utilizing the procedure described in the preceding paragraph, from a fermented broth fermented by a vitamin $B_{12}$-synthesizing strain of Streptomyces, effecting a chromatographic fractionation by adding said solvent solution to a column of adsorbent material, and washing the column with solvent fractionally to elute the APF active substance from the adsorbent medium.

In accordance with one embodiment of our invention, said elaboration product (derived from a vitamin $B_{12}$-synthesizing strain of Streptomyces) is extracted with an extraction solvent such as water or a lower aliphatic water-miscible alcohol, preferably methyl alcohol. The selection of the extraction liquid is determined by the adsorbent material to be used in the chromatographic fractionation.

Various adsorbents can be utilized at various stages in the practice of this invention, including activated carbon, activated alumina, and the like. Activated alumina is the preferred adsorbent in the chromatograph step or steps. Aqueous extractions are employed when chromatographic columns containing activated carbon are used and lower aliphatic water-miscible alcohol extractions are used for activated alumina columns. The column is preferably wet packed, by filling with the adsorbent and the solvent used in the extraction and then allowing the solvent to drain out until its level reaches the top of the adsorbent material in the column. The adsorbent is conveniently supported on a wire screen covered with a layer of sand.

When an alumina column is employed for the chromatograph, the alcoholic, preferably methanolic extract is poured on the upper surface of the adsorbent in the column, and allowed to flow into the adsorbent either by gravity, or under pressure. The column is then developed with additional amounts of the extraction solvent to develop in the column zones of adsorbent material containing vitamin $B_{12}$ in differing amounts and differing degrees of purity, and suitably fractions of the eluate are collected as the zones emerge from the bottom of the column. Those fractions containing sufficient activity as determined microbiologically or by virtue of their pink color are concentrated, either separately or combined, to a heavy syrup. This concentrate is then mixed with a lower aliphatic alcohol and a miscible non-solvent in which the active substance is insoluble, such as acetone, is added. The red flocculent precipitate which forms is recovered, and can be used as a highly concentrated source of APF.

The red flocculent precipitate may be further purified by dissolving it in a solvent for vitamin $B_{12}$, such as methyl or ethyl alcohol or water, and precipitating it with a miscible non-solvent for vitamin $B_{12}$, such as acetone, one or more times. During such treatment, the solution, if not clear before adding the precipitant, may be filtered to remove insoluble impurities. The number of such precipitations and treatments desirable varies with different batches. A guide to the number of useful precipitations is absence of brownish or yellowish color in the supernatant liquid after precipitation. In some cases, after several such treatments, vitamin $B_{12}$ may be crystallized from a water solution by adding acetone to the point of incipient turbidity and allowing red needle-like crystals to form.

However, when a crystalline product or a high degree of purification is wanted, it is often desirable to subject the product obtained from the first chromatographic fractionation (either before or after one or more of the above-mentioned precipitation steps) to a second chromatographic fractionation. This is accomplished by dissolving the amorphous product in a lower aliphatic alcohol. The solution can be added to a second column of activated alumina and the more active fractions of eluate as determined above can be collected and concentrated to dryness. The dry residue may be dissolved in methyl alcohol and acetone added to the solution causing a red precipitate of vitamin $B_{12}$ to separate. This precipitate may be dissolved in water and acetone added to the solution causing red crystals to separate. The crystals may be redissolved in water and precipitated with acetone several times to remove any impurities that may still remain.

Vitamin $B_{12}$, obtained in a substantially pure state in accordance with our invention, is a red compound having an approximate composition typified by the following analysis made on two samples dried in vacuo for two hours at 100° C.; C, 56.35, 56.11; H, 6.72, 6.72; N, 14.51, 14.76; P, 2.24, 2.27; Co, 4.42, 4.58.

Substantially all of the differences between the sum of the percentages given and 100% is believed to be oxygen and no other metals are indicated to be present by spectrum analysis. Based on the foregoing analysis, vitamin $B_{12}$ has the approximate empirical formula of about $C_{61-64}H_{86-92}N_{14}O_{13}PCo$. Vitamin $B_{12}$ is substantially soluble in water, methyl alcohol, ethyl alcohol and phenol and substantially insoluble in acetone, ether and chloroform. Vitamin $B_{12}$ has an apparent partition coefficient of about 1.46 in the system: 75% toluene–25%-ortho-cresol: water. It has been found that vitamin $B_{12}$ has a partition coefficient of about 1.2 in the system water/benzyl alcohol.

Vitamin $B_{12}$ crystallizes from suitable solutions such as aqueous acetone as red crystals having the following crystallographic properties: refractive indices $\alpha$, 1.619; $\beta$, 1.649; $\gamma$, 1.659. Vitamin $B_{12}$ crystals have no definite melting point but darken at about 210°–220° C.

The adsorption spectrum of vitamin $B_{12}$ in aqueous solution is characterized by maxima at 2780 Å

$$(E_{1\,cm.}^{1\%}=114.7)$$

at 3610 Å

$$(E_{1\,cm.}^{1\%}=203.5)$$

and at 5500 Å

$$(E_{1\,cm.}^{1\%}=62.7)$$

The spectrum does not change markedly with change of pH; in acid solution the intensity of the 3610 Å band decreases by about 10% and in alkaline solution there are other small changes and the fine structure becomes less marked.

The infra-red absorption spectrum was determined with a carefully calibrated Perkin-Elmer 12A Spectrometer. The following absorption maxima were observed:

Wave length in Mu ($10^{-4}$ cm.)
  3.05 S (broad)
  4.62 W
  5.98 S
  6.13 M
  6.70 S
  7.14 S
  7.35 S
  7.60 W
  8.15 S
  8.67 S
  9.36 S
  10.00 S
  10.80 W
  11.10 W
  11.81 M
  12.35 M S, M and W designate strong, medium and weak adsorption intensities.

The following examples illustrate methods of carrying out the present invention but it is to be understood that these examples are given for purposes of illustration and not of limitation.

EXAMPLE 1

A 4000 gal. fermentor was charged with 95 lb. of concentrated beef extract (approximately 70% solids), 315 lb. of a tryptic digest of casein, 160 lb. of sodium chloride, 720 g. of ferrous sulfate heptahydrate, 20 liters of soy bean oil, and about 3500 gal. of water. The solution was sterilized for 30 minutes at 120° C., cooled to about 28° C., and inoculated with 300 gal. of a vegetative culture of a grisein, APF and vitamin $B_{12}$ producing strain of *Streptomyces griseus*. The inoculated medium was fermented at a temperature of about 28° C. for a period of about 28 hours, and was mechanically agitated and aerated continuously with approximately 5000 cubic feet of air per hour. At the end of the fermentation period, the whole culture broth was acidified to pH 3 with phosphoric acid and filtered. The filter cake was washed with water, and the filtrate, with washings, was made slightly alkaline with sodium hydroxide, and again filtered. The resulting fermented broths had a pH of 7.8 and an LLD assay of 2400 LLD units per ml.

A. *Dried filtrate from S. griseus fermentation broth*

100 gallons of fermentation broth, prepared as described above, was evaporated at reduced pressure and at a temperature below 40° C. to a volume of about 6 gal. The concentrate, which had a microbiological activity of about 40,000 LLD units per mil., was then spray-dried. The dried material contained about 3% moisture, and had a microbiological activity of about 140 LLD units per mg.

B. *Charcoal adsorbate from S. griseus fermentation broth*

3500 gallons of the same fermented broth employed in "A" above was stirred with about 160 lb. of activated carbon (Norit) for 30 minutes. The adsorbate was removed by filtration and washed by suspending in 100 gal. of water and again filtering.

195 grams of the moist carbon adsorbate was dried in a vacuum oven at 45° C. for approximately 20 hours, yielding 99 g. of dried adsorbate. The LLD activity of the dried adsorbate was 470 LLD units per mg., as calculated from the activity originally present in the fermentation broth and the residual activity of the spent broth from the carbon adsorption.

C. Concentrate recovered from the eluate of the Charcoal adsorbate

The remainder of the washed carbon adsorbate described under B (from the same fermentation batch), representing about 160 lb. of activated carbon, was eluted by stirring for 30 minutes with 167 gal. of 25% pyridine. The spent cake was washed twice on the filter press; first by recycling 40 gal. of 25% pyridine for 20 minutes; and then by recycling 28 gal. of 25% pyridine for 20 minutes. Two-thirds of the combined eluate and wash was evaporated at reduced pressure (vapor temperature below 35° C.) to 24 liters. 150 ml. of the concentrated eluate, having an activity of about 250,000 LLD units/ml., was dried from the frozen state, to produce 14.1 g. of product having a potency of 2800 LLD units/mg.

D. Crystalline vitamin $B_{12}$

A solid concentrate prepared according to the procedure described under "B" and "C" above, starting with 3500 gal. of fermented broth was extracted with methyl alcohol and the alcoholic extract was then passed through a column containing activated alumina thereby adsorbing the vitamin $B_{12}$. The column was eluted with fresh methyl alcohol and those fractions of the eluate showing most pronounced LLD activity were concentrated together. The concentrated solution was then mixed with acetone whereupon crude vitamin $B_{12}$ precipitated and was recovered by filtration. This material was purified by reprecipitation from ethanol solution by the addition of acetone and the product further purified by crystallization from aqueous acetone to produce 106.0 mg. of crystalline vitamin $B_{12}$.

The value of the foregoing concentrates and of vitamin $B_{12}$ for replacing feed supplements containing "animal protein factor" was shown by the chick feeding tests described below, in which the growth of chicks maintained on an "APF" deficient diet was compared with the growth of chicks on the same diet supplemented by said concentrates and by vitamin $B_{12}$.

*Chick feeding tests.*—The chicks employed in these tests were hatched from eggs laid by hens maintained on a diet deficient in "APF," which had the following composition:

Day-old chicks were placed on a basal diet as follows:

| | Percent |
|---|---|
| Soy bean meal | 70.0 |
| Commercial dextrose | 7.9 |
| Cellulose | 5.0 |
| Wheat germ oil | 4.5 |
| Calcium gluconate | 2.5 |
| Glycine | 2.0 |
| DL-Methionine | 0.9 |
| $CaCO_3$ | 1.5 |
| $K_2HPO_4$ | 1.612 |
| $KH_2PO_4$ | 1.0 |
| NaCl | 0.838 |
| $MgSO_4.7H_2O$ | 0.51 |
| $CaHPO_4.2H_2O$ | 0.375 |
| Ferric citrate | 0.138 |
| $MnSO_4.4H_2O$ | 0.025 |
| KI | 0.004 |
| $CuSO_4.5H_2O$ | 0.0015 |
| $ZnCl_2$ | 0.00125 |
| L-Arginine | 0.50 |
| L-Cysteine | 0.20 |
| Choline | 0.20 |
| Inositol | 0.10 |
| p-Aminobenzoic acid | 0.03 |
| Niacin | 0.01 |
| Ca pantothenate | 0.004 |
| Riboflavin | 0.002 |
| Thiamin | 0.002 |
| Pyridoxine | 0.002 |
| Pteroylglutamic acid | 0.0004 |
| Menadione | 0.0004 |
| Biotin | 0.00004 |
| A & D powder | 0.10 |

After 5 days on the above basal diet, groups of 7 chicks each, balanced in regard to body weight, were selected and given the foregoing basal diets supplemented as indicated in the following table:

| Diet No. | Supplement | Amount of Supplement, Percent of Total Diet | LLD Units Added in Supplement per kg. of Diet | No. of Chicks |
|---|---|---|---|---|
| C-1068 | None | | 0 | 7 |
| C-1093 | Crystalline Vit. $B_{12}$ | 0.000003 | 330,000 | 7 |
| C-1094 | Dried S. griseus broth (Concentrate A above). | 0.3 | 420,000 | 7 |
| C-1095 | Dried S. griseus charcoal adsorbate (B above). | 0.1 | 470,000 | 7 |
| C-1096 | Lyophilized aqueous pyridone eluate of S. griseus charcoal adsorbate (C above). | 0.02 | 560,000 | 7 |

The rates of growth of these chicks are summarized in the following table:

| Chick Age in Days | 5 | 8 | 10 | 12 | 15 | 17 | Increment over Gain on C-1068 17 Days of Age |
|---|---|---|---|---|---|---|---|
| Diet: | | | | | | | |
| C-1068 | 49.9 | 57.3 | 59.7 | 67.6 | 66.2 | 66.5 | |
| C-1093 | 49.9 | 58.7 | 67.0 | 79.3 | 107.3 | 125.8 | 59.3 |
| C-1094 | 49.9 | 58.9 | 65.9 | 77.7 | 92.4 | 117.8 | 51.3 |
| C-1095 | 49.9 | 60.4 | 67.3 | 82.5 | 108.7 | 126.7 | 60.2 |
| C-1096 | 49.9 | 58.6 | 67.9 | 83.1 | 102.6 | 122.6 | 56.1 |

These tests clearly establish that the growth of test chicks is markedly increased, as compared with chicks fed on an "APF" deficient diet, by feeding the test chicks said basal diet enriched with any one of the above concentrates, or vitamin $B_{12}$. Moreover each of the concentrates (C-1094, C-1095 and C-1096) added in an amount not greater than 10% of the weight of the APF deficient chick feed have produced a maximal growth in chicks comparable with that obtained by feeding chicks said feed enriched with 30 mg. of vitamin $B_{12}$ per kg. (i. e. 0.000003% vitamin $B_{12}$).

EXAMPLE 2

A 4000 gallon fermenter was charged with 95 lb. of beef extract concentrate, 315 lb. of a tryptic digest of casein, 160 lb. of sodium chloride, 20 liters of antifoam agent (soy bean oil), and 3500 gallons of water. The medium was sterilized, inoculated, fermented, acidified, filtered, and neutralized as described in Example 1.

The neutral filtered fermentation broth (approximately 4000 gallons) was stirred with 96 lb. of activated carbon for 30 minutes to adsorb the LLD active constituents. The adsorbate was removed by filtration and washed by suspending in about 100 gallons of water and again filtering. The washed adsorbate was eluted by stirring for 30 minutes with 95 gallons of 25% alpha-picoline, and the eluate recovered by filtration. The filter cake was washed on the filter press by recycling 30 gallons of 25% alpha-picoline for 30 minutes. The combined eluate and wash was evaporated under reduced pressure (vapor temperature below 35° C.) to a volume of 6 gallons and diluted with 60 gallons of methanol. Inert material, which precipitated, was removed, and the crude LLD active constituents were precipitated by adding the methanol solution to 180 gallons of ether. The precipitate was recovered by filtration, washed with ether, and dried in a vacuum oven at a temperature below 30° C. to produce 860 g. of dried product; microbiological potency 1500 LLD units/mg.

The value of this material as a source of APF as compared with crude liver extract and with crystalline vitamin $B_{12}$ was determined biologically using chick feeding tests as described below.

*Chick feeding tests.*—The chicks employed were hatched from eggs laid by hens maintained on a diet deficient in the "animal protein factor."

Day-old chicks were placed on a basal diet, which was identical to that in Example 1, except that its content of soy bean meal was 40.0% and its content of commercial dextrose was 37.9%.

After five days on the above basal diet, groups of 7 chicks each, balanced in regard to body weight, were selected and given the foregoing basal diet (described in Example 1) supplemented as indicated in the following table:

| Diet No. | Supplement | Amount of Supplement, Percent of Total Diet | No. of Chicks |
|---|---|---|---|
| C-1014A | None | | 7 |
| C-1014B | do | | 7 |
| C-1055 | Crude Liver Extract | 1 | 7 |
| C-1059 | S. griseus Fermentation Concentrate Prepared Above | 0.0227 | 7 |
| C-1057 | Crystalline Vitamin $B_{12}$ | 0.000003 | 7 |

The rates of growth of the chicks on these diets are summarized below:

MEAN BODY WEIGHT IN GRAMS

| Chick Age in Days | 5 | 8 | 10 | 12 | 15 | 18 | Increment Over Gain on C-1014 18 Days of Age |
|---|---|---|---|---|---|---|---|
| Diet: | | | | | | | |
| C-1014A | 50.4 | 60.1 | 66.0 | 77.9 | 93.9 | 113.0 | (114.8) average. |
| C-1014B | 50.4 | 59.7 | 66.9 | 78.4 | 97.1 | 116.7 | |
| C-1055 | 50.4 | 60.2 | 68.3 | 83.5 | 105.7 | 133.2 | 18.4 |
| C-1059 | 50.4 | 62.4 | 71.6 | 84.7 | 109.1 | 135.6 | 20.8 |
| C-1057 | 50.4 | 61.3 | 68.7 | 83.4 | 107.7 | 132.6 | 17.8 |

These tests show that the growth of test chicks is markedly increased as compared with chicks fed on APF deficient basal diet by feeding the test chicks said basal diet enriched with either an *S. griseus* fermentation concentrate or vitamin $B_{12}$. The tests also show that the increased growth is approximately the same as that produced by feeding test chicks the basal diet enriched with 1% of crude liver extract which is one of the best of the previously known sources of the "animal protein factor."

EXAMPLE 3

A nutrient medium was prepared containing the following:

| | | |
|---|---|---|
| Soy bean meal | percent | 3 |
| Dextrose | do | 2 |
| Distillers solubles | do | 0.75 |
| NaCl | do | 0.25 |
| $Co^{++}$ | p. p. m. | 1 |
| Tap water to 100%. | | |

This medium was prepared, sterilized, cooled, and inoculated with 10% by volume of a vegetable culture of a streptomycin, APF and vitamin $B_{12}$ producing strain of *Streptomyces griseus*. After inoculation, the inoculated broth was agitated at 27° C. for 3.5 days under submerged, aerated conditions. The fermented broth was acidified with phosphoric acid to pH 3 and filtered through diatomaceous silica ("Supercel"). Assay of the filtered fermentation broth showed a streptomycin activity of 810 γ/ml. and an LLD activity of 2700 LLD units/ml.

60 gallons of this filtered fermentation broth was passed through a column containing 600 g. of a carboxylic acid type ion exchange resin (IRC-50 supplied by the Resinous Products and Chemical Co.) thereby adsorbing the streptomcyin on the resin. The effluent broths from which the streptomycin was thus removed were combined.

A. *Charcoal adsorbate*

75 liters of this effluent broth was treated with 1600 g. of activated carbon (Norit A) whereby the carbon adsorbed 75% of the LLD active substances originally present in the broth.

The carbon adsorbate was washed and dried. The dry product contained approximately 80,000 LLD units/gram and can be used in the same way as the charcoal adsorbate described in Example 1 for the enrichment of animal feeds deficient in "APF."

B. *Fuller's earth adsorbate*

40 liters of effluent broth prepared substantially as described above (but assaying 500 LLD units per ml.) was adjusted to pH 2.5 with phosphoric acid, and the resulting broth was treated with 600 g. of fuller's earth ("O. K. Brand"). The fuller's earth adsorbate, which contained 90% of the LLD activity originally present in the broth, was washed and dried to produce a final dry product containing 30,000 LLD units/gram. This product was added to an APF-deficient chick feed at a level of 0.2% by weight of said feed and the enriched feed was fed to test chicks hatched from eggs laid by hens maintained on an APF-deficient diet. These chicks showed a maximal rate of growth comparable with that obtained by feeding test chicks said APF-deficient chick feed supplemented with 30 micrograms of vitamin $B_{12}$ per kilogram of feed. The APF activity per gram of the fuller's earth adsorbate was thus approximately equivalent to that shown by 1.5 micrograms of vitamin $B_{12}$ (i. e. 1.5 γ/gram).

C. *Spray-dried concentrate*

An 80 liter portion of the same effluent broth used as the starting material in part "A" of the present example, was evaporated to a volume of 12 liters. A portion of this concentrated solution (5740 ml.) was spray-dried to produce 335 g. of dry product having a microbiological potency of 140 LLD units/mg. This product can be used in the same way as the dried *S. griseus* broth described in Example 1 for the enrichment of animal feeds deficient in "APF."

D. *Pure vitamin $B_{12}$*

A fermented broth was prepared, as described in the first two paragraphs of the present example, by fermenting an aqueous nutrient medium with a strain of *Streptomyces griseus* which produces both streptomycin and vitamin $B_{12}$. The resulting broth was filtered and the filtered broth contacted with a carboxylic acid type ion-exchange resin, as set forth in paragraph 3 of the present example, to produce an effluent broth free of streptomycin and containing substantially all of the vitamin $B_{12}$ originally present in the fermented broth. The effluent broth was then treated with activated carbon, whereby the vitamin $B_{12}$ in the effluent broth was adsorbed on the carbon. The carbon adsorbate was eluted with aqueous pyridine thereby eluting the active material, and the pyridine eluate was evaporated to small volume. Ether was added to the concentrated eluate thereby precipitating an active concentrate which was dried.

The dry-ether-precipitated solid concentrate (1628 g. including 700 g. of filter aid), which had an LLD activity of 2500 units/mg., was ground to a fine powder and extracted four times by stirring for 30 minutes with 3500 ml. of methyl alcohol and filtering. The combined methyl alcohol extracts were chromatographed on 15 kg. of activated alumina, and the column washed with methyl alcohol. As soon as the red color characteristic of vitamin $B_{12}$ appeared in the effluent, a series of 3000 ml. fractions were collected. The first five of these, containing a total of 673 million LLB units, were combined and concentrated in vacuo at a temperature below 40° C. to 120 ml. The impure vitamin $B_{12}$ was recovered by pouring this solution into 120 ml. of acetone; the resulting red precipitate was removed by centrifugation, washed with acetone and dried at room temperature. Further purification was attained by dissolving the solid in 5 ml. of methyl alcohol and adding 25 ml. of acetone. The resulting precipitate was collected by centrifugation, washed with acetone, and dried, the yield was 89.8 mg.

The above red solid was dissolved in 3 ml. of methyl alcohol and chromatographed on 4.5 g. of activated alumina. The column was washed with methyl alcohol. When the red color characteristic of vitamin $B_{12}$ appeared in the eluate, a series of three to four ml. fractions was collected. The first five of these, containing substantially all of the red color, were individually evaporated to dryness, dissolved in about 0.3 ml. of water, and the solution treated with acetone until slightly turbid. On standing for 24 hours, red needle-like crystals formed in each of the five tubes. The crystals were collected and combined, washed with acetone, and dried. The yield was 14.1 mg. of crystalline vitamin $B_{12}$.

The various products herein described which possess an LLD activity of 65,000 LLD units to 11,000,000 LLD units per milligram are all suitable for the enrichment of animal feeds deficient in the animal protein factor.

EXAMPLE 4

A medium is prepared consisting of 1% of tryptic digest of casein, 0.3% beef extract concentrate, and 10 parts per million of cobaltous nitrate hexahydrate. The pH is adjusted to about 7. Seven portions of this medium of 500 ml. each are placed in 2-liter Erlenmeyer flasks and sterilized for 30 minutes at 115° C. Each flask is then inoculated with about 10 ml. of a vegetative culture of a selected strain of *Streptomyces roseochromogenus*, and fermented for 7 days on a rotary shaking machine. The contents of the flasks are then mixed and filtered.

One liter of filtered broth (about 1500 LLD units/ml.) is evaporated under reduced pressure (temperature below 35° C.) and dried from the frozen state, to produce 6.9 g. of product having an activity of about 130 LLD units/mg., and an APF activity, according to the chick test, equivalent to $7\gamma$ of vitamin $B_{12}$ per gram.

Another portion of filtered broth, amounting to 2300 ml., is stirred at pH 7 for 30 minutes with 23 g. of activated carbon. The adsorbate thus obtained, is eluted twice by stirring for 30 minutes with a mixture of 125 ml. of ethanol, 12.5 ml. of pyridine and 112.5 ml. of water. The combined eluates are evaporated under reduced pressure (temperature below 35° C.) and dried from the frozen state to produce 2.3 g. of product, which assays 440 LLD units/mg. and shows an APF activity, as determined by the chick test, equivalent to $24\gamma$ of vitamin $B_{12}$ per gram.

The dried fermentation residue and the carbon eluate prepared above can be used in the same manner as the products described in Example 1 for the enrichment of foodstuffs deficient in APF.

EXAMPLE 5

A selected strain of *Streptomyces albidoflavis* culture is prepared and used for carrying out a fermentation exactly as described in Example 4 for *Streptomyces rosechromogenus*.

The fermented broth is acidified to pH 3 with phosphoric acid, filtered, and the filtered broth is neutralized to about pH 7 with sodium hydroxide. 1570 ml. of neutral filtered broth (assaying 1000 units/ml.; 77 LLD units/mg. broth solids) is stirred for 30 minutes with 15.7 g. of activated carbon. The adsorbate, thus obtained, is recovered by filtration. The wet adsorbate is dried at 45° C. in a vacuum oven for 20 hours to produce 50.7 g. (including filter aid) of dried adsorbate. The LLD activity of the dried carbon adsorbate is about 30 units/mg. (as calculated from the potency of the original neutral filtered broth and of the spent broth from the carbon treatment). The APF activity of the adsorbate, according to the chick test, is equivalent to about $4\gamma$ of vitamin $B_{12}$ per gram.

This carbon adsorbate can be used in the same manner as the products described in Example 1 for the enrichment of foodstuffs deficient in APF.

EXAMPLE 6

A fermentation medium was prepared containing the following:

Pfeiffer's dried yeast _____ percent__ 2
Cobalt nitrate _____ p. p. m. as $Co^{++}$__ 10
Distilled water to make 100%.

40 ml. of the above medium in a 250 ml. flask was sterilized and inoculated with 5% by volume of a 28-hour vegetative growth of a selected strain of a grisein-producing strain of *Streptomyces griseus*. After inoculation, the inoculated broth was incubated at 28° C. for 72 hours, during which time the flask was shaken continuously on a rotary shaking machine.

After completion of the fermentation period, the LLD assay of the fermented broth was 4800 units per ml.

This broth is used to produce solid concentrates having APF activity or, if desired, pure vitamin $B_{12}$ according to the procedure described in Example 1.

EXAMPLE 7

2000 gallons of fermented culture medium, prepared with a grisein-producing strain of *S. griseus* as described in Example 1, was treated by the following process for isolation of vitamin $B_{12}$-like substances. The whole broth was adjusted to pH 2.5 with phosphoric acid and filtered. The pH of the filtered broth was adjusted to 7.5 with sodium hydroxide, and the broth was then extracted with one-tenth its volume of a mixture of 40 parts of cresol and 60 parts of carbon tetrachloride. The water layer was reextracted with a mixture of 25 parts of cresol and 75 parts of carbon tetrachloride. The two solvent extracts were combined and the resulting solution was extracted with one-tenth its volume of water. The solvent layer was separated and reextracted with one-tenth its volume of water. The two rich-water extracts were combined and mixed with 1.5 volumes of benzyl alcohol and the rich water saturated with ammonium sulfate. The benzyl alcohol layer was separated and the aqueous layer was reextracted with one-tenth its volume of benzyl alcohol. The rich benzyl alcohol extracts were combined and dried with sodium sulfate and chromatographed on an activated alumina column. The column was washed with a mixture of 1 part of methanol and 2 parts of alcohol to remove the benzyl alcohol and yellow impurities. The rich material was eluted with methanol and the red solid was precipitated from the methanol solution and dried under vacuum. The presence of vitamin $B_{12}$-like material in the red precipitate was demonstrated by the total color assay as outlined in column 7 of the specification. The amount of vitamin $B_{12}$ and vitamin $B_{12}$-like material was found, by measurement of optical density at 5500 Å. wave length, to be equivalent to 274 mg. of vitamin $B_{12}$. From this preparation there was obtained 136 mg. of a red-colored crystalline, highly active, vitamin produce consisting of vitamin $B_{12}$ and vitamin $B_{12}$-like substances. This product contained, in addition to vitamin $B_{12}$-like substances, 6.7% of vitamin $B_{12}$, as determined by the Craig counter-current distribution procedure described in column 7 of this application, except that a 16-plate (instead of an 8-plate) transfer was used. Assay of this material according to the chick test as outlined in Example 1 demonstrated that the crystalline vitamin $B_{12}$-like substances isolated from the fermentation medium were equivalent, in APF activity, to pure vitamin $B_{12}$.

EXAMPLE 8

A medium composed of 3% soy bean meal, 2% dextrose, 1% $CaCO_3$, 0.5% NaCl and 0.001% $CoNO_3.6H_2O$ in tap water was prepared. 480 L. of medium was sterilized at 120° C. for ½ hour in each of two stainless steel fermentors. After cooling, the fermentor was inoculated with a neomycin-producing strain of *Streptomyces fradiae*, produced as a vegetative culture in the above medium incubated on a rotary shaker. The fermentor was maintained at 27° C. and mechanically agitated and aerated for a period of 90 hours. Soy bean oil was added as needed as a defoamer. Assay for LLD factor content on filtered fermented broth, by *L. lactis* assay, indicated 7100 and 8300 LLD units per ml. in the two fermentors. The contents of the two fermentors were combined, acidified, filtered, and the presence of vitamin $B_{12}$-like material in the filtrate determined by the total color assay described elsewhere in this application. The total amount of vitamin $B_{12}$ and vitamin $B_{12}$-like substances, as estimated by the total color assay and calculated as vitamin $B_{12}$, was equivalent to 150 mg. of vitamin $B_{12}$ per 1000 gallons of fermented broth. The vitamin $B_{12}$ and vitamin $B_{12}$-like substances were isolated from the broth in the form of a crystalline mixture, utilizing substantially the same procedure as that described in Example 7. Assay of this mixture by the Craig counter-current distribution method described in page 15 of this application showed the mixture to contain 12% of vitamin $B_{12}$ per se. The vitamin $B_{12}$ content of the fermented broth was thus 18 mg. vitamin $B_{12}$ per 1000 gallons.

A portion of the vitamin $B_{12}$ contained in the mixture of vitamin $B_{12}$ and vitamin $B_{12}$-like substances was isolated as a crystalline product and the purity verified by counter-current distribution. 5.4 mg. pure crystalline vitamin $B_{12}$ was recovered per 1000 gallons of fermented broth. Concentrates of the fermentation broth obtained as described above, including the crystalline vitamin $B_{12}$ isolated as indicated, can be used for the enrichment of animal feeds deficient in the "animal protein factor."

Various changes and modifications may be made in carrying out the present invention without departing from the spirit and scope thereof. Insofar as these changes and modifications are within the purview of the annexed claims, they are to be considered as part of our invention.

We claim:

1. A process for the production of an L. L. D.-active substances which comprises fermenting an aqueous nutrient medium under submerged aerated conditions by means of an L. L. D.-activity producing strain of a Streptomyces, extracting L. L. D. substances therefrom, and recovering from the resulting extract an L. L. D.-active composition having an L. L. D. activity of at least 440 L. L. D. units per milligram.

2. A process for the production of a vitamin $B_{12}$-active composition which comprises fermenting an aqueous nutrient medium under submerged aerated conditions by means of a vitamin $B_{12}$-activity producing strain of a Streptomyces, extracting vitamin $B_{12}$-active substances therefrom, and recovering from the resulting extract a vitamin $B_{12}$-active composition having an L. L. D. activity of at least 440 L. L. D. units per milligram.

3. A process for the production of a vitamin $B_{12}$-active composition which comprises fermenting an aqueous nutrient medium under submerged aerated conditions by means of a vitamin $B_{12}$-activity producing strain of a Streptomyces griseus, extracting vitamin $B_{12}$-active substances therefrom, and recovering from the resulting extract a vitamin $B_{12}$-active composition having an L. L. D. activity of at least 440 L. L. D. units per milligram.

4. A process for the production of a vitamin $B_{12}$-active composition which comprises fermenting an aqueous nutrient medium under submerged aerated conditions by means of a vitamin $B_{12}$-activity producing strain and streptomycin-producing strain of a Streptomyces griseus, separating the streptomycin, extracting vitamin $B_{12}$-active substances from the streptomycin-free fermentation products, and recovering from the extract a vitamin $B_{12}$-active composition having an L. L. D. activity of at least 440 L. L. D. units per milligram.

5. A process for the production of a vitamin $B_{12}$-active composition which comprises fermenting an aqueous nutrient medium under submerged aerated conditions by means of a vitamin $B_{12}$-activity producing strain of a Streptomyces fradiae, extracting vitamin $B_{12}$-active substances therefrom, and recovering from the resulting extract a vitamin $B_{12}$-active composition having an L. L. D. activity of at least 440 L. L. D. units per milligram.

6. A process for the production of a vitamin $B_{12}$-active composition which comprises fermenting an aqueous nutrient medium under submerged aerated conditions by means of a vitamin $B_{12}$-activity producing strain of a Streptomyces venezulae, extracting vitamin $B_{12}$-active substances therefrom, and recovering from the resulting extract a vitamin $B_{12}$-active composition having an L. L. D. activity of at least 440 L. L. D. units per milligram.

7. A process for the production of a vitamin $B_{12}$-active composition which comprises fermenting an aqueous nutrient medium under submerged aerated conditions by means of a vitamin $B_{12}$-activity producing strain of a Streptomyces roseochromogenus, extracting vitamin $B_{12}$-active substances therefrom, and recovering from the resulting extract a vitamin $B_{12}$-active composition having an L. L. D. activity of at least 440 L. L. D. units per milligram.

8. A process for the production of a vitamin $B_{12}$-active composition which comprises fermenting an aqueous nutrient medium under submerged aerated conditions by means of a vitamin $B_{12}$-activity producing strain of a Streptomyces albidoflavis, extracting vitamin $B_{12}$-active substances therefrom, and recovering from the resulting extract a vitamin $B_{12}$-active composition having an L. L. D. activity of at least 440 L. L. D. units per milligram.

9. A process for the production of a vitamin $B_{12}$-active composition which comprises fermenting an aqueous nutrient medium under submerged aerated conditions by means of a vitamin $B_{12}$-activity producing strain of a Streptomyces, extracting vitamin $B_{12}$-active substances therefrom, and recovering from the resulting extract a vitamin $B_{12}$-active composition having an L. L. D. activity of at least 1500 L. L. D. units per milligram.

References Cited in the file of this patent

UNITED STATES PATENTS

| Number | Name | Date |
|---|---|---|
| 2,202,161 | Miner | May 28, 1940 |
| 2,267,050 | Stevens | Dec. 23, 1941 |
| 2,359,052 | Scharer | Sept. 26, 1944 |
| 2,447,814 | Novak | Aug. 24, 1948 |
| 2,449,340 | Tanner | Sept. 14, 1948 |
| 2,461,922 | Rake | Feb. 15, 1949 |
| 2,482,055 | Duggar | Sept. 13, 1949 |
| 2,483,892 | Ehrlich | Oct. 4, 1949 |
| 2,515,135 | Petty | July 11, 1950 |
| 2,541,420 | Howe et al. | Feb. 13, 1951 |
| 2,541,726 | Trussell | Feb. 13, 1951 |
| 2,560,830 | Turner | July 17, 1951 |
| 2,563,794 | Rickes | Aug. 7, 1951 |

OTHER REFERENCES

Le Page, Jour. Biol. Chem. 162 (1946) pages 163–171.

Reynolds et al., Proc. Soc. Exptl. Biol. and Med., 64, 1947, pages 327 to 331.

Waksman et al., Science, 109, March 25, 1949, pages 305–307.

Science News Letter for August 25, 1951, page 114.